United States Patent [19]
Brambilla et al.

[11] Patent Number: 6,005,359
[45] Date of Patent: Dec. 21, 1999

[54] POWER DOWN BRAKE LATCH CIRCUIT FOR A BRUSHLESS DC MOTOR

[75] Inventors: Massimiliano Brambilla, San Jose; Chinh Dac Nguyen, Sunnyvale; Eugene C. Lee, Cupertino, all of Calif.

[73] Assignee: STMicroelectronics, Inc., Carrollton, Tex.

[21] Appl. No.: 08/874,868

[22] Filed: Jun. 13, 1997

Related U.S. Application Data

[63] Continuation-in-part of application No. 08/496,731, Jun. 29, 1995, abandoned.

[51] Int. Cl.$^6$ ...................................................... H02K 7/10
[52] U.S. Cl. ........................... 318/368; 318/376; 318/375; 318/459; 360/74.1
[58] Field of Search ...................................... 318/368, 376, 318/447, 453, 455, 459, 383, 364–372, 375–377; 360/74.1, 75

[56] References Cited

U.S. PATENT DOCUMENTS

| | | | |
|---|---|---|---|
| 3,699,416 | 10/1972 | Sloan et al. | 318/211 |
| 4,479,080 | 10/1984 | Lambert | 318/373 |
| 4,658,308 | 4/1987 | Sander, Jr. | 360/74.1 |
| 5,091,680 | 2/1992 | Palm | 318/368 |
| 5,170,105 | 12/1992 | Kumar | 318/362 |
| 5,172,036 | 12/1992 | Cameron | 318/138 |
| 5,221,881 | 6/1993 | Cameron | 318/254 |
| 5,249,877 | 10/1993 | Cameron | 318/809 |
| 5,306,988 | 4/1994 | Carobolante et al. | 318/254 |
| 5,317,243 | 5/1994 | Cameron | 318/254 |
| 5,331,261 | 7/1994 | Brown et al. | 318/376 |
| 5,377,094 | 12/1994 | Williams et al. | 363/132 |
| 5,449,993 | 9/1995 | Davis | 318/701 |
| 5,455,496 | 10/1995 | Williams et al. | 318/563 |

*Primary Examiner*—David Martin
*Attorney, Agent, or Firm*—David V. Carlson; Theodore E. Galanthay; Lisa K. Jorgenson

[57] ABSTRACT

A power down brake latch circuit for dynamically braking a spindle motor in a disk drive system is disclosed. The power down brake latch circuit includes a reservoir capacitor, a smoothing capacitor, a timing circuit, and a logic circuit. The timing circuit includes a voltage divider and a bandgap comparator. The smoothing capacitor absorbs a BEMF voltage from the spindle motor as it rotates after losing power. The timing circuit generates a first signal when a voltage on the smoothing capacitor falls below a threshold. The logic circuit brakes the spindle motor in response to the loss of power and the generation of the first signal.

19 Claims, 2 Drawing Sheets

6,005,359

POWER DOWN BRAKE LATCH CIRCUIT FOR A BRUSHLESS DC MOTOR

CROSS-REFERENCE TO RELATED APPLICATION

This application is a continuation-in-part of U.S. Pat. application Ser. No. 08/496,731, filed Jun. 29, 1995, now abandoned.

TECHNICAL FIELD

The present invention relates to brushless direct current motors such as those used in disk drive systems, and in particular, to the dynamic braking of a spindle motor when the motor has lost power.

BACKGROUND OF THE INVENTION

A block diagram of a conventional disk drive system is shown in FIG. 1. The disk drive system includes a disk drive microprocessor 8, a control logic circuit 10, a voltage fault detector circuit 12, a set of voice coil motor drivers 14, a voice coil motor 16, a head carriage 20, a set of read/write heads 21, a magnetic media 22, a spindle motor 24, and a set of spindle motor drivers 26. The disk drive system is operated in the following manner. A host computer 4 communicates through a controller 6 to exchange commands and/or data with the disk drive microprocessor 8. The disk drive microprocessor 8 forwards the commands and/or data to the control logic circuit 10 which responds by directing the spindle motor drivers 26 to rotate the spindle motor 24 and the magnetic media 22 at a substantially constant velocity. The voice coil motor 16 moves the read/write heads 21 over specific tracks on the magnetic media 22 in response to commands from the control logic circuit 10. Once the read/write heads 21 have stabilized over the appropriate tracks, they can read data from or write data to the magnetic media 22 in a conventional manner.

In conventional disk drive systems such as the one shown in FIG. 1, the magnetic media 22 rotates at a high velocity and the read/write heads 21 are narrowly spaced from the magnetic media 22 as they move across it. In this environment, the read/write heads 21 may easily make contact with the magnetic media 22 in what is known as a head crash which can have catastrophic results. Data may be permanently lost. In addition, the read/write heads 21 or the magnetic media 22 may be damaged by the head crash to such an extent that the entire disk drive system no longer functions. Therefore, virtually all modern disk drive systems are designed to minimize contact between the read/write heads 21 and the magnetic media 22. To this end, many disk drive systems park their read/write heads 21 when the disk drive system is powered down such that the read/write heads 21 land on a parking zone on the magnetic media 22 rather than on an area of the magnetic media 22 which stores data. A parking zone is an area of the magnetic media 22 where data is not stored and is typically selected to be over tracks closest to a center of the magnetic media 22. This selection minimizes wear on tracks in the magnetic media 22 where data is stored and increases the reliability of the disk drive system and the integrity of the data it stores. Additionally, many disk drive systems minimize wear of the read/write heads 21 by braking their spindle motors 24 as quickly as possible to stop rotation and minimize the amount of time the read/write heads 21 are dragging on the magnetic media 22.

When power is first supplied to the disk drive system from a supply voltage, the operation of the disk drive system is inhibited by the voltage fault detector circuit 12 until the supply voltage is considered to have stabilized. At that time, the voltage fault detector circuit 12 pulls a power on reset signal or POR signal on a line 11 to a low voltage. Conversely, the voltage fault detector circuit 12 pulls the POR signal to a high voltage when the supply voltage drops below a safe operating voltage. In this latter case the control logic circuit 10 is powered by a capacitor 9 until the read/write heads 21 can be retracted and the spindle motor 24 is braked. In the disk drive system shown in FIG. 1, there is a substantial risk of a head crash if the spindle motor 24 is braked before the read/write heads 21 have been retracted.

SUMMARY OF THE INVENTION

An embodiment of the present invention is directed to a disk drive system including a spindle motor, a voltage supply, a smoothing capacitor, and a braking circuit. The smoothing capacitor receives a back EMF voltage from the spindle motor as it rotates when the voltage supply is insufficient. The braking circuit generates a braking signal after a voltage supply signal indicates that the voltage supply is insufficient and a voltage on the smoothing capacitor is less than or equal to a threshold. The braking signal is applied to the spindle motor to brake the spindle motor.

Another embodiment of the present invention is directed to a method for braking a spindle motor. A first signal is generated when a voltage supply to the spindle motor is insufficient. Energy generated by the rotor rotating after the generation of the first signal is stored in a smoothing capacitor, and a voltage on a plate of the smoothing capacitor is sensed. A second signal is generated when the voltage on the plate of the smoothing capacitor is less than or equal to a first threshold. A braking signal is generated in response to the generation of the first and second signals which is coupled to the spindle motor to brake the spindle motor.

DETAILED DESCRIPTION OF THE INVENTION

Figure 2:
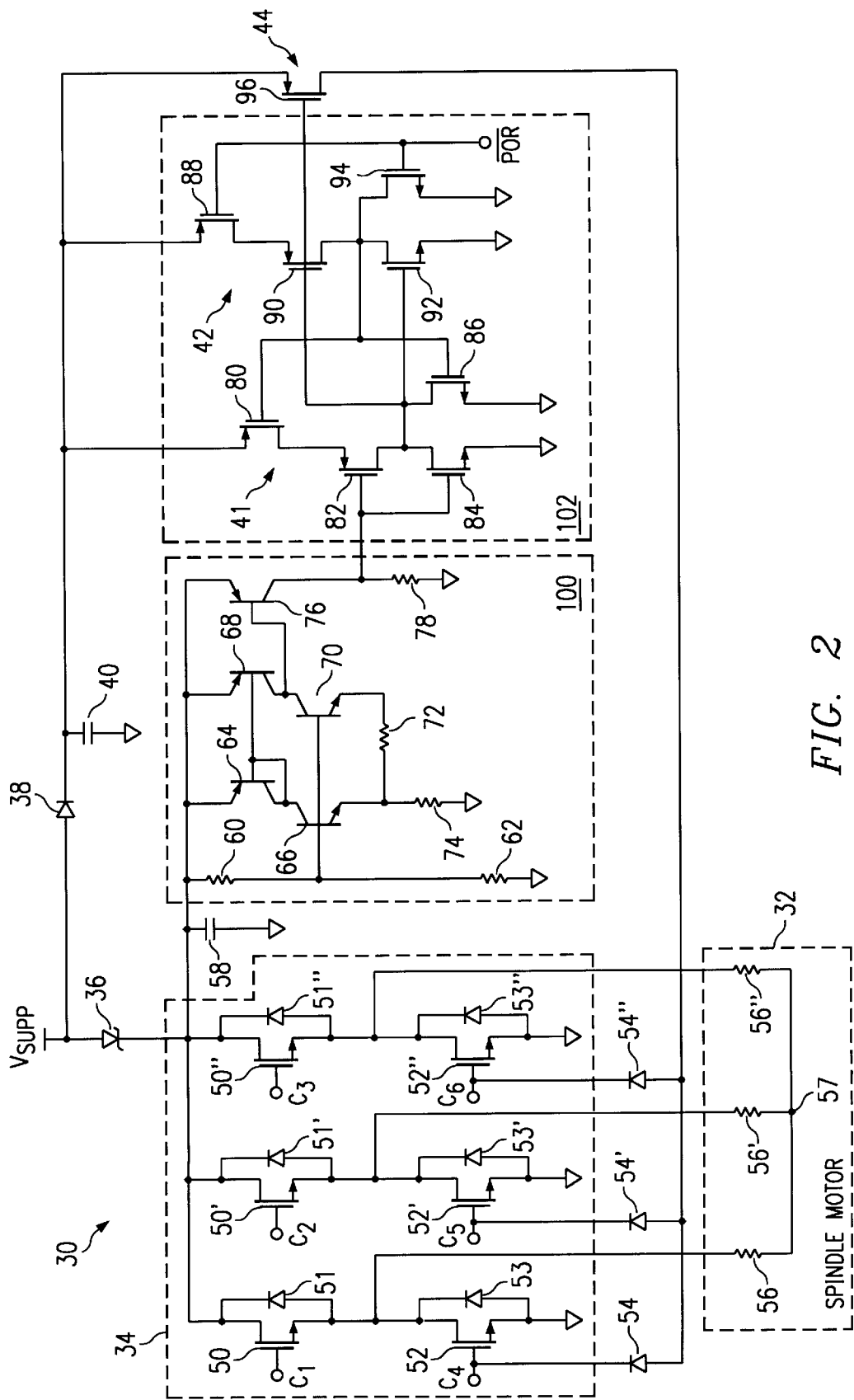
FIG. 2 is an electrical schematic diagram of a brake latch circuit according to an embodiment of the invention.

A brake latch circuit 30 for dynamically braking a spindle motor in a disk drive system according to an embodiment of the invention is shown in FIG. 2. The brake latch circuit 30 includes a spindle motor 32, three bridge circuits 34, a reservoir capacitor 40, a smoothing capacitor 58, a timing circuit 100, and a logic circuit 102. The spindle motor 32 includes a rotor (not shown) and first, second, and third stator coils 56, 56', and 56" connected in a wye configuration. The stator coils 56, 56', and 56" are connected to each other at a center tap 57. The center tap 57 may be connected to a voltage supply or left floating as shown in FIG. 2.

Each of the stator coils 56, 56', and 56" is driven by a pair of N-channel MOSFET driving transistors: a low side driving transistor and a high side driving transistor. One end of the first stator coil 56 is connected to a source of a first high side driving transistor 50 and to a drain of a first low side driving transistor 52. One end of the second stator coil 56' is similarly connected to a source of a second high side driving transistor 50' and to a drain of a second low side driving transistor 52'. Finally, one end of the third stator coil 56" is connected to a source of a third high side driving transistor 50" and to a drain of a third low side driving transistor 52". The first high side driving transistor 50 and the first low side driving transistor 52 form a first bridge circuit. The second high side driving transistor 50' and the second low side driving transistor 52' form a second bridge circuit. The third high side driving transistor 50" and the third low side driving transistor 52" form a third bridge circuit.

Each of the high side driving transistors 50, 50', and 50" includes a drain connected to a cathode of a Zener diode 36. An anode of the Zener diode 36 is connected to a supply voltage $V_{SUPP}$. Each of the low side driving transistors 52, 52', and 52" also includes a source connected to a ground voltage reference. Each of the high side driving transistors 50, 50', and 50" is coupled to a respective flyback diode 51, 51', and 51". Each of the low side driving transistors 52, 52', and 52" is coupled to a respective flyback diode 53, 53', and 53". For each of the driving transistors 50, 50', 50", 52, 52', and 52", an anode of its respective flyback diode is connected to the source of the driving transistor, and a cathode of its respective flyback diode is connected to the drain of the driving transistor. The flyback diode allows current to travel from the source to the drain of the driving transistor when a voltage at the source exceeds a voltage at the drain.

Each of the high side driving transistors 50, 50', and 50" and the low side driving transistors 52, 52', and 52" have a control terminal, or a gate, receiving a control signal which governs the conductive state of the driving transistor. The gates of the high side driving transistors 50, 50', and 50" are controlled by respective control signals $C_1$, $C_2$, and $C_3$, and the gates of the low side driving transistors 52, 52', and 52" are controlled by respective control signals $C_4$, $C_5$, and $C_6$. The control signals $C_1$, $C_2$, $C_3$, $C_4$, $C_5$, and $C_6$ are provided by a control logic circuit (not shown) to couple the stator coils 56, 56', and 56" in turn between the supply voltage $V_{SUPP}$ and the ground voltage reference, thereby driving the rotor to rotate at a substantially constant velocity according to a method which is well known to those skilled in the art.

The smoothing capacitor 58 includes a first plate connected to the drains of each of the high side driving transistors 50, 50', and 50", and a second plate connected to the ground voltage reference.

The timing circuit 100 includes the following elements. A resistor 60 is connected in series with a resistor 62 between the first plate of the smoothing capacitor 58 and the ground voltage reference to form a voltage divider. An emitter of a PNP transistor 64 is connected to an emitter of each of two PNP transistors 68 and 76 and to the first plate of the smoothing capacitor 58. A base of the transistor 68 is connected to a base and a collector of the transistor 64. The collector of the transistor 64 is also connected to a collector of an NPN transistor 66. A base of the transistor 66 is connected to a base of an NPN transistor 70. An emitter of the transistor 66 is connected to a first end of a resistor 72 and to a first end of a resistor 74. A second end of the resistor 72 is connected to an emitter of the transistor 70. A second end of the resistor 74 is connected to the ground voltage reference. A collector of the transistor 68 and a collector of the transistor 70 are connected to a base of the transistor 76. A collector of the transistor 76 is connected by a resistor 78 to the ground voltage reference.

The transistors 64, 66, 68, 70, and 76 and the resistors 72, 74, and 78 form a bandgap comparator. The bandgap comparator has an input at the connection between the bases of the transistors 66 and 70 and a node between the resistors 60 and 62. The resistors 60 and 62 divide a voltage from the first plate of the smoothing capacitor 58 and provide the divided voltage to the input of the bandgap comparator. The connection between the collector of the transistor 76 and the resistor 78 forms an output of the bandgap comparator and the timing circuit 100.

The logic circuit 102 includes a first NOR gate 41 cross-coupled to a second NOR gate 42. The logic circuit 102 receives a voltage supply from the reservoir capacitor 40 which is charged by the supply voltage $V_{SUPP}$ through a diode 38. A first plate of the reservoir capacitor 40 is connected to a cathode of the diode 38 and a second plate of the reservoir capacitor 40 is connected to the ground voltage reference. An anode of the diode 38 is connected to the supply voltage $V_{SUPP}$.

The first NOR gate 41 includes a P-channel MOSFET transistor 80 having a source connected to the first plate of the reservoir capacitor 40. A drain of the transistor 80 is connected to a source of a P-channel MOSFET transistor 82. A drain of the transistor 82 is connected to a drain of each of two N-channel MOSFET transistors 84 and 86. A gate of the transistor 82 and a gate of the transistor 84 are connected together to form a first input of the first NOR gate 41. The gates of the transistors 82 and 84 are connected to the output of the timing circuit 100. A source of the transistor 84 and a source of the transistor 86 are connected to the ground voltage reference. A gate of the transistor 80 and a gate of the transistor 86 are connected together to form a second input of the first NOR gate 41. An output of the first NOR gate 41 is formed by the connection between the drains of the transistors 82, 84, and 86.

The second NOR gate 42 includes a P-channel MOSFET transistor 88 having a source connected to the first plate of the reservoir capacitor 40. A drain of the transistor 88 is connected to a source of a P-channel MOSFET transistor 90. A drain of the transistor 90 is connected to a drain of each of two N-channel MOSFET transistors 92 and 94. A gate of the transistor 90 and a gate of the transistor 92 are connected together to form a first input of the second NOR gate 42. A gate of the transistor 88 and a gate of the transistor 94 are connected together to form a second input of the second NOR gate 42 which receives an inverted power-on reset signal or $\overline{POR}$ signal. The $\overline{POR}$ signal is generated by inverting a POR signal produced by a voltage fault detector circuit in a disk drive system such as the disk drive system described above. A source of the transistor 92 and a source of the transistor 94 are connected to the ground voltage reference. An output of the second NOR gate 42 is formed by the connection between the drains of the transistors 90, 92, and 94.

The first and second NOR gates 41 and 42 are cross coupled in the following manner. The drains of the transistors 82, 84, and 86, forming the output of the first NOR gate 41, are connected to the gates of the transistors 90 and 92 forming the first input of the second NOR gate 42. The drains of the transistors 90, 92, and 94, forming the output of the second NOR gate 42, are connected to the gates of the transistors 80 and 86 forming the second input of the first NOR gate 41.

The output of the first NOR gate 41 is connected to an input of an inverter 44 implemented by a P-channel MOSFET transistor 96 having a gate as the input. A source of the transistor 96 is connected to the first plate of the reservoir capacitor 40. A drain of the transistor 96 is connected to an anode of each of first, second, and third diodes 54, 54', and 54". A cathode of the first diode 54 is connected to the gate of the first low side driving transistor 52. A cathode of the second diode 54' is connected to the gate of the second low side driving transistor 52'. A cathode of the third diode 54" is connected to the gate of the third low side driving transistor 52". When a low signal is applied to its gate, the transistor 96 couples the first plate of the reservoir capacitor 40 to the gates of the low side driving transistors 52, 52', and 52" through the diodes 54, 54', and 54". The diodes 54, 54', and 54" isolate the transistor 96 from the control signals applied to the gates of the low side driving transistors 52, 52', and 52".

Figure 1:
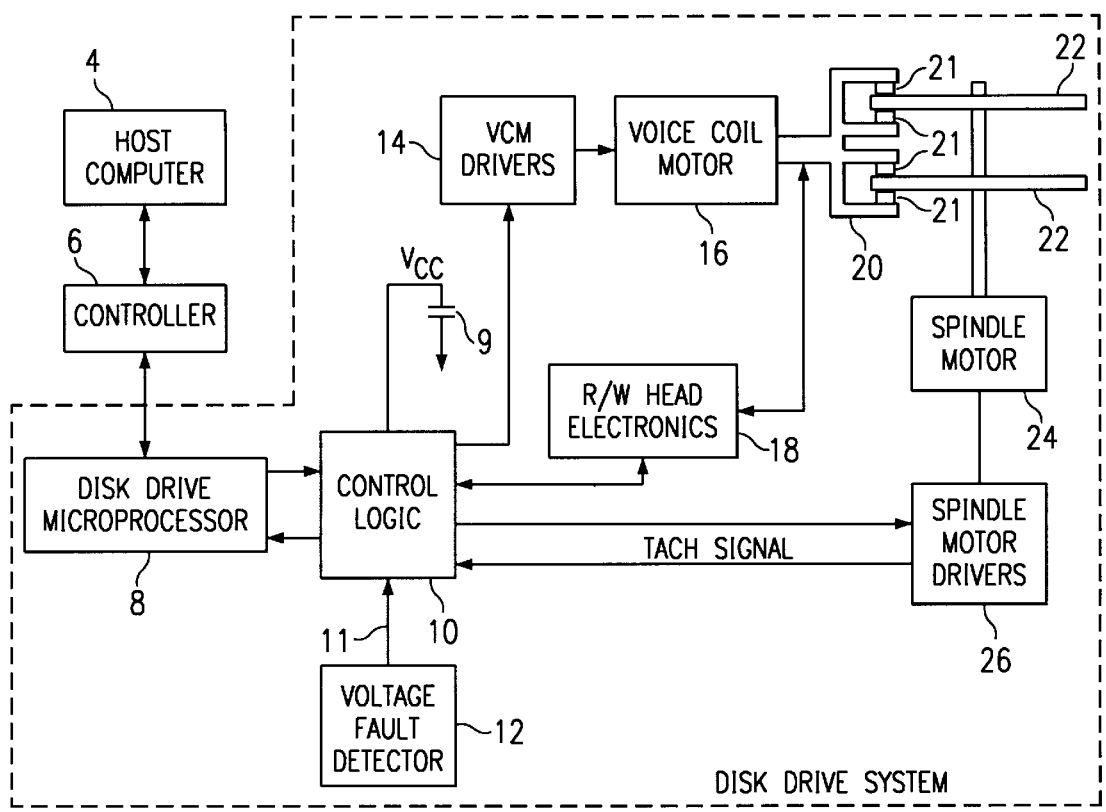
FIG. 1 is a block diagram of a disk drive system according to the prior art.
Figure 3:
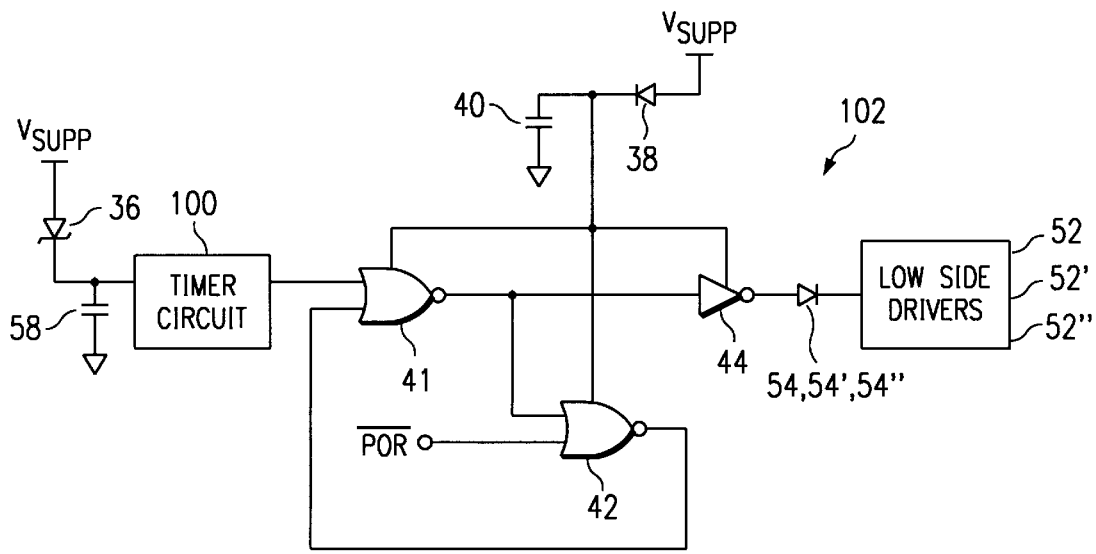
FIG. 3 is a block diagram of a logic circuit included in the brake latch circuit shown in FIG. 2.

FIG. 3 is a block diagram of the smoothing capacitor 58, the timing circuit 100, the reservoir capacitor 40, the logic circuit 102, the inverter 44, the diodes 54, 54', and 54", and the low side driving transistors 52, 52', and 52". The timing circuit 100 is connected to the first plate of the smoothing capacitor 58. The first NOR gate 41 receives the output of timing circuit 100 and the output of the second NOR gate 42. The second NOR gate 42 receives the output of the first NOR gate 41 and the $\overline{POR}$ signal. The output of the first NOR gate 41 is inverted by the inverter 44 which applies the inverted output to the gates of the low side driving transistors 52, 52', and 52". The NOR gates 41 and 42 and the inverter 44 receive a voltage from the reservoir capacitor 40.

The brake latch circuit 30 operates to brake the spindle motor 32 in the following manner. During a normal operation of the spindle motor 32 power is provided by the supply voltage $V_{SUPP}$ through the Zener diode 36 to the three bridge circuits 34 to drive the stator coils 56, 56', and 56" and thereby cause a rotation of the rotor in the spindle motor 32. The gates of the high side driving transistors 50, 50', and 50" and the low side driving transistors 52, 52', and 52" are driven by the control signals $C_1$, $C_2$, $C_3$, $C_4$, $C_5$, and $C_6$, as described above, in a manner known to those skilled in the art. Additionally, the reservoir capacitor 40 is charged by a voltage equal to the supply voltage $V_{SUPP}$ less a voltage drop across the diode 38. The smoothing capacitor 58 is charged by a voltage equal to the supply voltage $V_{SUPP}$ less a voltage drop across the Zener diode 36.

The supply voltage $V_{SUPP}$ may be terminated for any number of reasons including a shutdown of the disk drive system or a loss of power. When the voltage supply $V_{SUPP}$ is terminated, the $\overline{POR}$ signal is pulled from a logic 1 to a logic 0. The rotor of the spindle motor 32 is no longer driven, but continues to rotate freely with a rotational velocity because of its inertial mass, thereby generating a back EMF voltage in the stator coils 56, 56', and 56". The back EMF voltage is applied to the smoothing capacitor 58 through the flyback diodes 51, 51', and 51" of the high side driving transistors 50, 50', and 50". As a result, the voltage across the smoothing capacitor 58 is maintained by the rotational velocity of the rotor.

As the rotor slows due to frictional effects, the voltage across the smoothing capacitor 58 falls. The timing circuit 100 maintains at its output a logic 0 while there is a sufficient voltage across the smoothing capacitor 58. When the voltage across the smoothing capacitor 58 falls below an input threshold, the timing circuit 100 shifts to provide a logic 1 at its output to initiate a braking procedure. The smoothing capacitor 58 and the timing circuit 100 thereby provide a delay between the termination of the supply voltage $V_{SUPP}$ and a braking of the spindle motor 32.

In the embodiment of the invention shown in FIG. 2, the bandgap comparator of the timing circuit 100 has an input threshold of 1.2 volts. The input threshold may be set by selecting the transistors 64 and 68 such that they have a one-to-one current ratio, and selecting the transistors 66 and 70 so that they have a one-to-eight current ratio. The resistor 72 may be a 3 K-ohm resistor and the resistor 74 may be a 15 K-ohm resistor. If the resistor 60 has a resistance of 40 K-ohms and the resistor 62 has a resistance of 60 K-ohms, then the output of the timing circuit 100 will switch states when the voltage across the smoothing capacitor 58 reaches approximately 2 volts. At that point, the resistor 78 yields to current in the transistor 76 and shifts the output of the timing circuit from a logic 0 to a logic 1.

The logic circuit 102 is in a prebraking state before the termination of the supply voltage $V_{SUPP}$. The output of the timing circuit 100 is a logic 0 and the $\overline{POR}$ signal provides a logic 1 value. As a result, the output of the second NOR gate 42 is a logic 0 and the output of the first NOR gate 41 is a logic 1. The inverter 44 inverts the output of the first NOR gate 41 and produces a logic 0 at its output which does not interfere with the control of the gates of the low side driving transistors 52, 52', and 52".

When the supply voltage $V_{SUPP}$ is terminated, the logic circuit 102 is powered by the reservoir capacitor 40. The voltage stored by the reservoir capacitor 40 is preserved by the diode 38. As described above, the $\overline{POR}$ signal is pulled from a logic 1 to a logic 0. When the voltage across the smoothing capacitor 58 falls below the input threshold, the output of the timing circuit 100 shifts from a logic 0 to a logic 1, the output of the first NOR gate 41 shifts from a logic 1 to a logic 0, and as a result the output of the second NOR gate 42 is pulled from a logic 0 to a logic 1 which latches the output of the first NOR gate 41. The inverter 44 inverts the logic 0 from the output of the first NOR gate 41 and applies a logic 1 to the gates of each of the low side driving transistors 52, 52', and 52" through the diodes 54, 54', and 54", respectively, to switch the low side driving transistors 52, 52', and 52" on. The spindle motor is braked when the stator coils 56, 56', and 56" are coupled to the ground voltage reference through the low side driving transistors 52, 52', and 52".

According to the embodiment of the invention shown in FIG. 2, the timing circuit 100 delays a dynamic braking of the spindle motor 32 until its rotor has slowed down to a point where the voltage across the smoothing capacitor 58 reaches approximately 2 volts. An advantage of the embodiment shown in FIG. 2 is that the timing circuit 100 delays braking by using the voltage across the smoothing capacitor 58 rather than the voltage from the reservoir capacitor 40. Additionally, the logic circuit 102 uses very little current during the dynamic braking since all the devices are MOSFET transistors, and current from the reservoir capacitor 40 is only expended when the logic circuit 102 is in transition from one state to another. The embodiment of the invention shown in FIG. 2 provides for a delay between the termination of the supply voltage $V_{SUPP}$ and a dynamic braking of the spindle motor 32 to allow a set of read heads to be parked on a magnetic media in the disk drive system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A circuit for braking a spindle motor in a disk drive system, the spindle motor having a plurality of stator coils receiving power from a voltage supply through a plurality of bridge circuits, each stator coil being connected between a high side driving transistor having a flyback diode and a low side driving transistor in a respective one of the bridge circuits, the circuit comprising:

a smoothing capacitor coupled to the high side driving transistors to receive a back EMF voltage from the stator coils through the flyback diodes after the voltage supply to the spindle motor is terminated, wherein a voltage across the smoothing capacitor is provided in part by the back EMF voltage;

a braking circuit having a first input coupled to the smoothing capacitor and a second input receiving a voltage supply signal indicative of a voltage level of the voltage supply, the braking circuit being structured to generate a braking signal after the voltage supply signal indicates that the voltage supply is below a first threshold and the voltage on the smoothing capacitor falls below a second threshold, wherein the voltage on the smoothing capacitor falls as the back EMF voltage decreases; and a second circuit having an input receiving the braking signal and an output coupled to the bridge circuits, the second circuit being structured to cause the bridge circuits to couple the stator coils to a reference voltage to brake the spindle motor in response to the braking signal, wherein the EMF voltage received by the smoothing capacitor through the flyback diodes of the high side driving transistors provide a delay to braking the spindle motor.

2. The circuit of claim 1 wherein the braking circuit comprises:

a timing circuit having an input coupled to the smoothing capacitor and an output, the timing circuit being structured to generate a first signal at its output when the voltage on the smoothing capacitor is below the second threshold; and a logic circuit having a first input coupled to the output of the timing circuit to receive the first signal and a second input coupled to receive the voltage supply signal, the logic circuit being structured to generate the braking signal at an output.

3. The circuit of claim 2 wherein the timing circuit comprises a bandgap comparator circuit.

4. The circuit of claim 2 wherein the logic circuit comprises:

a first NOR gate having a first input coupled to the output of the timing circuit to receive the first signal, a second input, and an output;

a second NOR gate having a first input coupled to the output of the first NOR gate, a second input receiving the voltage supply signal, and an output coupled to the second input of the first NOR gate; and wherein the first NOR gate is structured to generate the braking signal at its output in response to the first signal and the voltage supply signal.

5. A disk drive system, comprising:

a spindle motor including a plurality of stator coils;

a plurality of bridge circuits, each bridge circuit including a high side driving transistor with a flyback diode and a low side driving transistor, the high side and low side driving transistors being connected together at a node which is connected to an end of a respective one of the stator coils;

a voltage supply coupled to each of the high side driving transistors;

a reference voltage connected to each of the low side driving transistors;

a smoothing capacitor coupled to the high side driving transistors to receive a back EMF voltage from the stator coils through each flyback diode when the voltage supply is reduced below a first threshold wherein a voltage on the smoothing capacitor is provided in part by the back EMF voltage; and a braking circuit having a first input coupled to the smoothing capacitor, a second input receiving a voltage supply signal, and an output coupled to the low side driving transistors, the braking circuit being structured to generate a braking signal after the voltage supply signal indicates that the voltage supply is below the first threshold and the voltage on the smoothing capacitor falls below a second threshold wherein the voltage on the smoothing capacitor falls as the back EMF voltage decreases, the braking circuit being structured to apply the braking signal to the low side driving transistors to brake the spindle motor based on a delay provided by the smoothing capacitor receiving the back EMF voltage through the flyback diodes of the high side driving transistors.

6. The disk drive system of claim 5 wherein the braking circuit comprises:

a timing circuit having an input coupled to the smoothing capacitor and an output, the timing circuit generating a first signal at its output when the voltage on the smoothing capacitor is below the second threshold;

a logic circuit having a first input coupled to the output of the timing circuit to receive the first signal and a second input coupled to receive the voltage supply signal, the logic circuit being structured to generate a second signal at an output; and an inverter circuit having an input coupled to the output of the logic circuit to receive the second signal and being structured to generate the braking signal at an output in response to the second signal.

7. The disk drive system of claim 5, further comprising a reservoir capacitor coupled to supply an operating voltage to the logic circuit, the reservoir capacitor being isolated from the voltage supply by a diode when the voltage supply is below the first threshold.

8. A braking circuit for a spindle motor having a plurality of stator coils, each of the stator coils being connected between a high side driving transistor and a low side driving transistor, each low side driving transistor having a control terminal and being connected between a reference voltage and a respective one of the stator coils, each high side driving transistor having a flyback diode and being coupled between a voltage supply and a respective one of the stator coils, the braking circuit comprising:

a smoothing capacitor having a first plate connected to the reference voltage and a second plate coupled to each high side driving transistor, the second plate having a voltage;

a timing circuit having an input coupled to the second plate of the smoothing capacitor and an output, the timing circuit being structured to generate a first signal at its output when the voltage on the second plate of the smoothing capacitor falls below a first threshold; and a logic circuit having a first input connected to the output of the timing circuit, a second input receiving a voltage supply signal, and an output coupled to the control terminals of the low side driving transistors, the logic circuit being structured to generate a braking signal at its output in response to the first signal after the voltage supply signal indicates that the voltage supply is insufficient to drive the spindle motor, the braking signal causing the low side driving transistors to couple the stator coils to the reference voltage to brake the spindle motor, wherein the second plate of the smoothing capacitor receives a back EMF voltage from the stator coils through the flyback diodes of the high side driving transistors when the voltage supply is insufficient to drive the spindle motor, the back EMF voltage initially maintaining the voltage on the second plate, the voltage of the second plate decreasing as the EMF voltage decreases, the back EMF received by the second plate of the smoothing capacitor providing a delay in generating the first signal.

9. The braking circuit of claim 8 wherein the timing circuit comprises a voltage divider connected to a bandgap comparator circuit structured to generate the first signal.

10. The braking circuit of claim 8 wherein the reference voltage is a ground voltage.

11. The braking circuit of claim 8 wherein the logic circuit comprises:
a first NOR gate having a first input coupled to the output of the timing circuit to receive the first signal, a second input, and an output;
a second NOR gate having a first input coupled to the output of the first NOR gate, a second input receiving the voltage supply signal, and an output coupled to the second input of the first NOR gate; and
wherein the first NOR gate is structured to generate the braking signal at its output in response to the first signal and the voltage supply signal.

12. The braking circuit of claim 11, further comprising an inverter having an input coupled to the output of the first NOR gate and an output coupled to the control terminals of the low side driving transistors, the inverter being structured to receive the braking signal and generate at its output an inverted braking signal that switches ON the low side driving transistors to brake the spindle motor.

13. The braking circuit of claim 8, further comprising a reservoir capacitor coupled to supply an operating voltage to the logic circuit, the reservoir capacitor being isolated from the voltage supply by a diode when the voltage supply is insufficient to drive the spindle motor.

14. A method for braking a spindle motor having a plurality of stator coils, each of the stator coils being connected between a high side driving transistor and a low side driving transistor and being coupled to a voltage supply through the high side driving transistor, each low side driving transistor being coupled between a reference voltage and a respective one of the stator coils, the method comprising:
generating a first signal when the voltage supply is insufficient to drive the spindle motor;
storing in a smoothing capacitor energy received from the stator coils through the high side driving transistors when the voltage supply is insufficient to drive the spindle motor;
sensing a voltage on the smoothing capacitor, wherein the voltage on the smoothing capacitor decreases as the energy received from the stator coils decreases;
generating a second signal when the voltage on the smoothing capacitor is less than a first threshold wherein the energy received from the stator coils provide a delay in which the voltage on the smoothing capacitor falls below the first threshold;
generating a braking signal in response to the generation of the first and second signals; and coupling the stator coils to the reference voltage in response to the braking signal, thereby braking the spindle motor.

15. The method of claim 14 wherein the storing energy in a smoothing capacitor comprises:
switching off each high side driving transistor and each low side driving transistor to isolate the stator coils generating a back EMF when the voltage supply falls below a level sufficient to drive the spindle motor; and
transmitting the back EMF to the smoothing capacitor for storage therein.

16. The method of claim 15 wherein the generating a first signal comprises generating a first signal from a voltage fault detector circuit when the voltage supply falls below a second threshold.

17. A circuit for braking a spindle motor in a disk drive system, the spindle motor having a plurality of stator coils receiving power from a voltage supply through a plurality of bridge circuits, each stator coil being connected between a high side driving transistor having a flyback diode and a low side driving transistor in a respective one of the bridge circuits, the circuit comprising:
a smoothing capacitor coupled to the high side driving transistors to receive a back EMF voltage from the stator coils after the voltage supply is terminated;
a braking circuit having a first input coupled to the smoothing capacitor and a second input receiving a voltage supply signal indicative of a voltage level of the voltage supply, the braking circuit being structured to generate a braking signal after the voltage supply signal indicates that the voltage supply is below a first threshold and a voltage on the smoothing capacitor is below a second threshold, the braking circuit further comprising a timing circuit having an output coupled to the smoothing capacitor and an output, the timing circuit being structured to generate a first signal at its output when the voltage on the smoothing capacitor is below the second threshold, and a logic circuit having a first input coupled to the output of the timing circuit to receive the first signal and a second input coupled to the voltage supply signal, the logic circuit being structured to generate the braking signal at an output; and
a second circuit having an input receiving the braking signal and an output coupled to the bridge circuits, the second circuit being structured to cause the bridge circuits to couple the stator coils to a reference voltage to brake the spindle motor in response to the braking signal.

18. The circuit of claim 17 wherein the timing circuit comprises a band gap comparator.

19. The circuit of claim 17 wherein the logic circuit comprises:
a first NOR gate having a first input coupled to the output of the timing circuit to receive the first signal, a second input, and an output;
a second NOR gate having a first input coupled to the output of the first NOR gate, a second input receiving the voltage supply signal, and an output coupled to the second input of the first NOR gate; and
wherein the first NOR gate is structured to generate the braking signal at its output in response to the first signal and the voltage supply signal.

* * * * *

UNITED STATES PATENT AND TRADEMARK OFFICE
CERTIFICATE OF CORRECTION

PATENT NO.    : 6,005,359
DATED         : December 21, 1999
INVENTOR(S)   : Massimiliano Brambilla Page 1 of 1

It is certified that error appears in the above-identified patent and that said Letters Patent is hereby corrected as shown below:

<u>Title page,</u>
U.S. PATENT DOCUMENTS, -- 5,504,402  4/02/96  Menegoli  318  377 --

FOREIGN PATENT APPLICATION,
AL    044101A2    10/26/90    Europe
AM    9-23688     1/21/97     Japan Signed and Sealed this Fifth Day of February, 2002

*Attest:*

JAMES E. ROGAN
*Attesting Officer*       *Director of the United States Patent and Trademark Office*